(12) United States Patent
Gunti et al.

(10) Patent No.: US 10,705,867 B2
(45) Date of Patent: Jul. 7, 2020

(54) HYPERVISOR EXCHANGE WITH VIRTUAL MACHINES IN MEMORY

(71) Applicant: VMware, Inc., Palo Alto, CA (US)

(72) Inventors: Mukund Gunti, Sunnyvale, CA (US); Vishnu Sekhar, Sunnyvale, CA (US); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 313 days.

(21) Appl. No.: 15/189,115

(22) Filed: Jun. 22, 2016

(65) Prior Publication Data
US 2017/0371691 A1  Dec. 28, 2017

(51) Int. Cl.
*G06F 9/455* (2018.01)
*G06F 12/109* (2016.01)

(52) U.S. Cl.
CPC ........ *G06F 9/45558* (2013.01); *G06F 12/109* (2013.01); *G06F 2009/45575* (2013.01); *G06F 2009/45583* (2013.01); *G06F 2212/1016* (2013.01); *G06F 2212/151* (2013.01); *G06F 2212/651* (2013.01); *G06F 2212/656* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 6,961,941 B1 | 11/2005 | Nelson et al. | |
| 7,814,495 B1 | 10/2010 | Lim et al. | |
| 7,818,726 B2 | 10/2010 | Apparvoo et al. | |
| 8,181,007 B2 | 5/2012 | Liu | |
| 2006/0242442 A1 | 10/2006 | Armstrong et al. | |
| 2008/0184373 A1 | 7/2008 | Traut et al. | |
| 2010/0125845 A1 | 5/2010 | Sugumar et al. | |
| 2012/0017031 A1 | 1/2012 | Mashtizadeh et al. | |
| 2013/0263118 A1 | 10/2013 | Kannan et al. | |
| 2014/0019968 A1 | 1/2014 | Deng et al. | |
| 2014/0149635 A1 | 5/2014 | Bacher et al. | |
| 2014/0282539 A1 | 9/2014 | Sonnek | |

(Continued)

FOREIGN PATENT DOCUMENTS

WO  WO 20141149583  9/2014

OTHER PUBLICATIONS

Brasser et al., Swap and Play: Live Updating Hypervisors and Its Application to Xen, Nov. 2014, ACM New York, CCSW '14 Proceedings of the 6th edition of the ACM Workshop on Cloud Computing Security, pp. 33-44 (Year: 2014).*

*Primary Examiner* — Duy Khuong T Nguyen
*Assistant Examiner* — Melissa A Headly

(57) ABSTRACT

A hypervisor-exchange process includes: suspending, by an "old" hypervisor, resident virtual machines; exchanging the old hypervisor for a new hypervisor, and resuming, by the new hypervisor, the resident virtual machines. The suspending can include "in-memory" suspension of the virtual machines until the virtual machines are resumed by the new hypervisor. Thus, there is no need to load the virtual machines from storage prior to the resuming. As a result, any interruption of the virtual machines is minimized. In some embodiments, the resident virtual machines are migrated onto one or more host virtual machines to reduce the number of virtual machines being suspended.

11 Claims, 7 Drawing Sheets

(56) References Cited

U.S. PATENT DOCUMENTS

| | | |
|---|---|---|
| 2015/0135175 A1* | 5/2015 | Bacher ................ G06F 9/45558 718/1 |
| 2015/0169329 A1 | 6/2015 | Barrat et al. |
| 2015/0212844 A1* | 7/2015 | Tsirkin ................ G06F 9/45558 718/1 |
| 2015/0324227 A1 | 11/2015 | Sizemore |
| 2016/0026489 A1 | 1/2016 | Maislos et al. |
| 2017/0147452 A1* | 5/2017 | Cao ..................... G06F 11/1484 |

* cited by examiner

HYPERVISOR EXCHANGE WITH VIRTUAL MACHINES IN MEMORY

BACKGROUND

Upgrading a hypervisor can involve shutting down the virtual-machines hosted by the hypervisor. Depending on the mission(s) to which the virtual machines have been dedicated, the shutdown may be costly or otherwise unacceptable. To avoid the shutdown, the virtual machines can be migrated to a standby machine, e.g., using a product such as vMotion, available from VMware, Inc. For example, when upgrading ESX, available from VMware, Inc., the host is put in a maintenance mode that will migrate all the virtual machines from the host machine to a standby machine. While the virtual machines execute on the standby machine, the original host machine can be provided with an upgraded hypervisor. The virtual machines can be migrated back, completing the upgrade. Of course, if the standby machine has an instance of the upgraded hypervisor, the return migration may be omitted.

Relying on migration to a standby machine to avoid shutting down virtual machines can be problematic. First of all, the required standby machine may not be available. Also, depending on the number of virtual machines and/or their average size, each migration may consume considerable network bandwidth for an extended duration, depriving other network nodes of the bandwidth they may need. For example, a large virtual-machine system can include more than 100 gigabytes (GB) that must be migrated. Accordingly, there remains a need for a less burdensome approach to upgrading (or reverting, downgrading, cross-grading or otherwise updating or exchanging) hypervisors.

DETAILED DESCRIPTION

The present invention calls for: suspending, by an old hypervisor, virtual machines; exchanging the old hypervisor for a new hypervisor; and the new hypervisor resuming the virtual machines. Some hypervisors suspend a virtual machine to disk. However, in accordance with an aspect of the invention, the old hypervisor suspends virtual machines in memory so that they can be resumed without having to be loaded first into memory. This in-memory suspension greatly reduces any interruption of virtual machines involved in upgrading or otherwise exchanging hypervisors.

Figure 1:
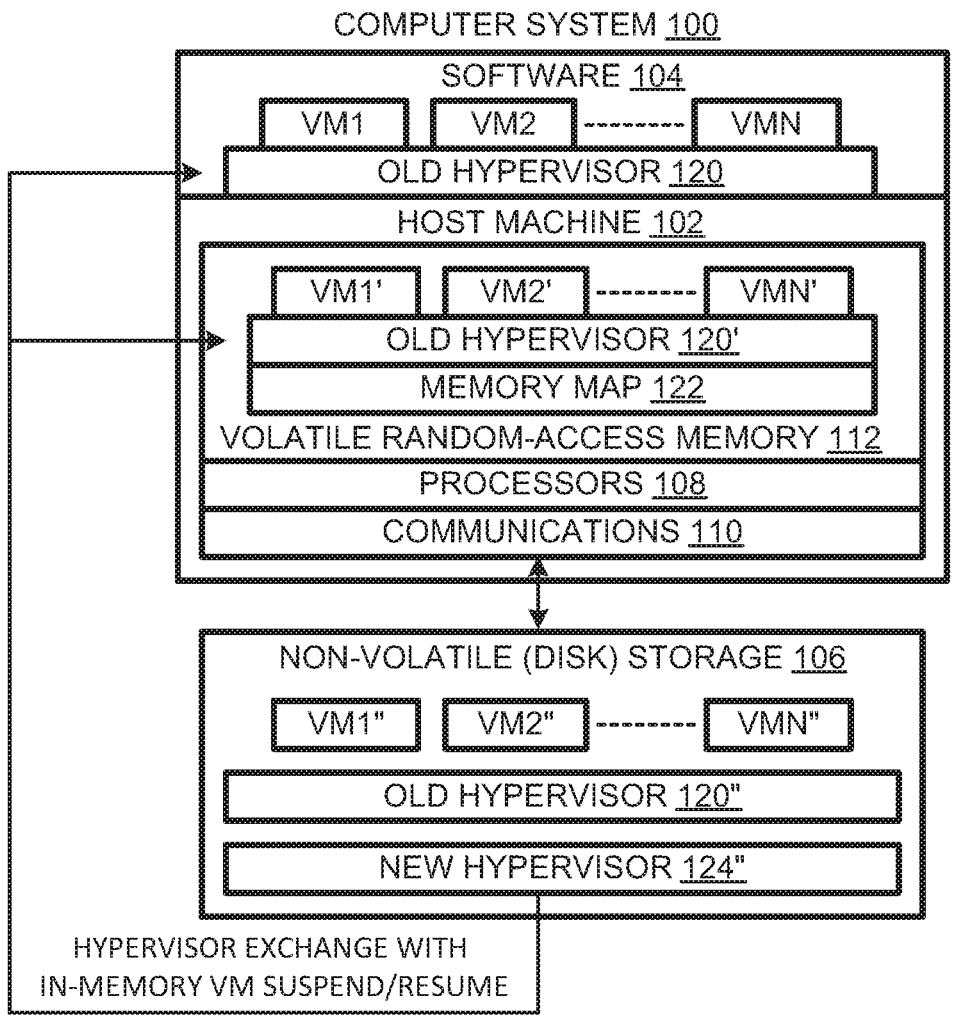
FIG. 1 is a schematic diagram of a computer system at the beginning of a hypervisor exchange while virtual machines are suspended in memory.

For example, as shown in FIG. 1, a computer system 100 includes a host machine 102 and software 104 executing on machine 102. In addition, computer system 100 includes external storage 106, which can be non-volatile disk-based storage. In some embodiments, the host machine includes internal storage in addition to or in lieu of external storage.

Host machine 102 includes processors 108, communications devices 110, and memory 112. Communications devices 110 can include network interface cards (NICs) for network connections and storage controllers for communicating with storage 106. Memory 112 can be volatile dynamic random-access memory (DRAM) or non-volatile random-access memory NVRAM.

Memory 112 and storage 106 are media encoded with code that, when executed by processors, defines software processes of an "old" hypervisor 120, and virtual machines VM1, VM2, . . . VMN, that execute on old hypervisor 120. Each software entity can include components stored in memory 112 and components stored in storage 106. For old hypervisor 120, component 120' is stored in memory 112 and component 120" is stored in storage 106. For virtual machines VM1, VM2, VMN, components VM1', VM2', VMN' are stored in memory 112; components VM1", VM2", VMN" are stored in storage 106.

In addition to old hypervisor component 120' and virtual memory components VM1'-VMN', memory 112 includes a memory map 122. Memory map 122 includes metadata that describes the virtual machines and identifies the portions (e.g., pages, ranges) of memory 112 used to store virtual machines, in this case where VM1'-VMN' are stored. In the illustrated embodiment the memory map is created when the virtual machines are suspended; in an alternative embodiment, the memory map is maintained and updated while the virtual machines are running. Memory map 122 can be a table in memory that has records for each virtual machine. In addition to old hypervisor image 120" and virtual machine images VM1"-VMN", storage 106 stores, at the time represented in FIG. 1, a new hypervisor image 124". The new hypervisor is to be an upgrade to old hypervisor 120, but it has not been launched at the time represented in FIG. 1.

Figure 2:
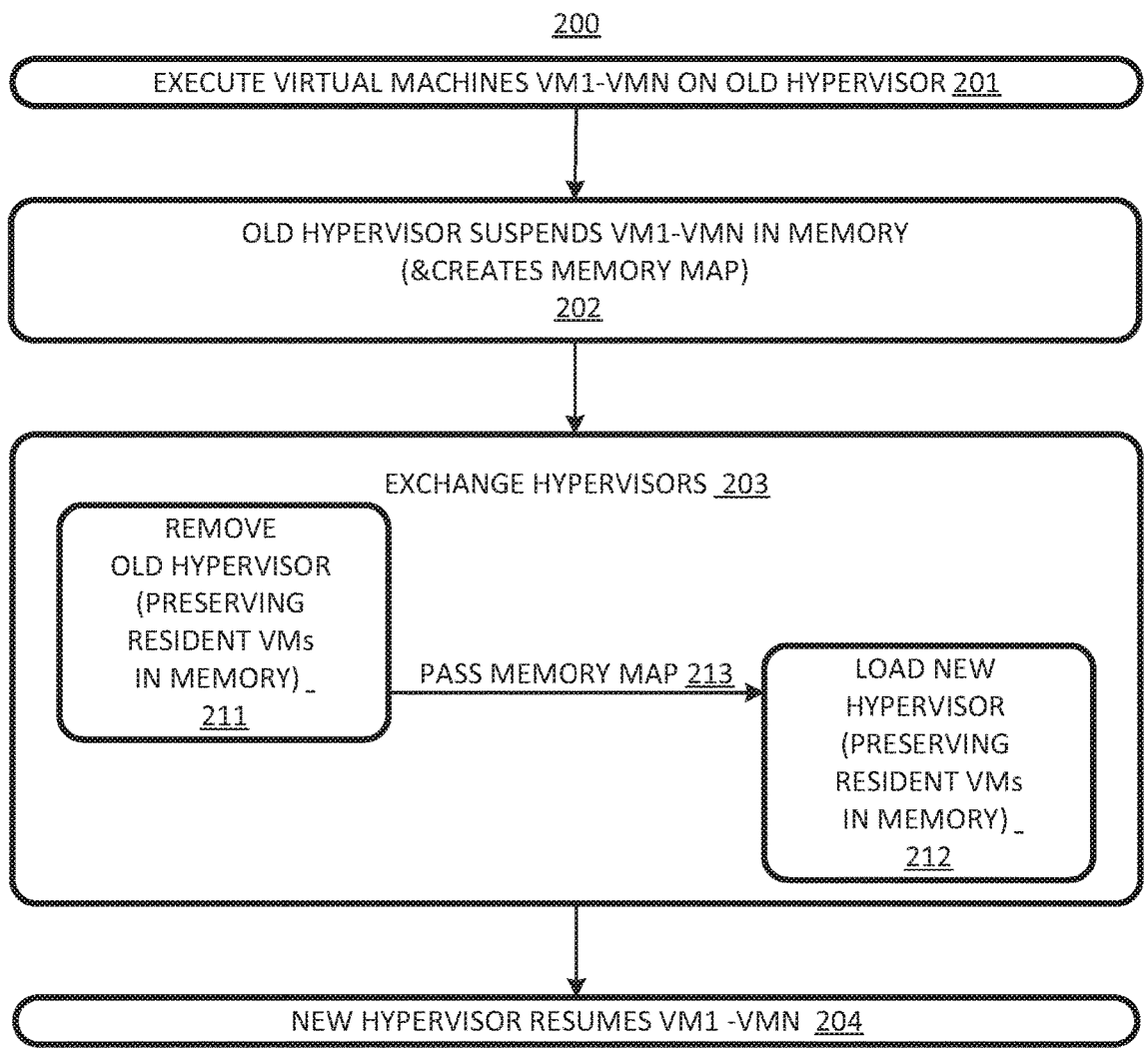
FIG. 2 is a flow-chart of a process for exchanging hypervisors as called for by FIG. 1.

A hypervisor-exchange process 200, FIG. 2, provides for replacing old hypervisor 120 with the new hypervisor. At 201, resident virtual machines VM1-VMN are executing on an "old" hypervisor. At 202, the old hypervisor suspends the resident virtual machines; in the illustrated embodiment, the hypervisor creates the memory map upon suspending the virtual machines. This is an "in-memory" suspension such that virtual-memory components VM1'-VMN' remain in memory 112. The suspension encapsulates all the state that is necessary for resuming the execution of the virtual machines. At 203, the old hypervisor is exchanged for the new hypervisor. At 204, the new hypervisor resumes the resident virtual machines, completing process 200.

Hypervisor exchange 203 includes, at 211, tearing down and removing the old hypervisor from memory 112. Memory map 122 is used to avoid writing over any memory required for preserving the states of the suspended virtual-machines. During the tear down of the old hypervisor, the new hypervisor version is launched using a soft boot at 212. Before tear down 211 is complete, the old hypervisor passes, e.g., via memory or via storage, the memory map and any other configuration data for the virtual machines to the new hypervisor at 213. As 212 proceeds, the memory map is used to avoid overwriting virtual-machine state data in memory.

Figure 3:
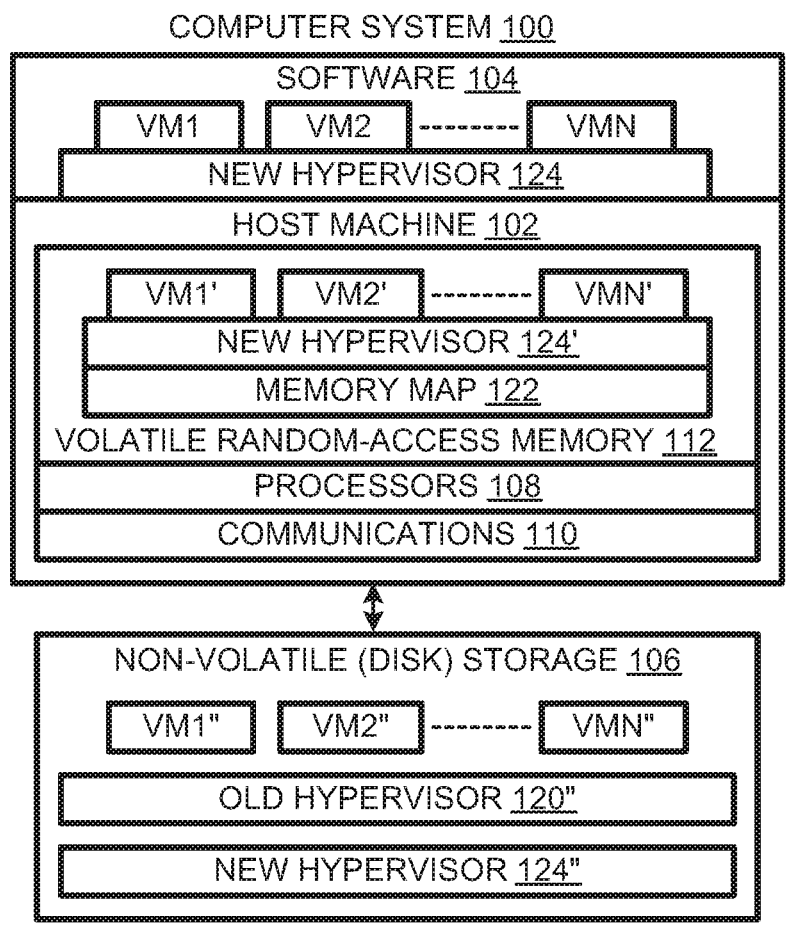
FIG. 3 is a schematic diagram of the computer system of FIG. 1 at the end of the process of FIG. 2.

Once the new hypervisor is fully booted, the hypervisor exchange is complete. The new hypervisor can then resume the virtual machines (e.g., one by one) to complete process 200. The result of process 200 is shown in FIG. 3, in which a new hypervisor 124 has replaced old hypervisor 120 and a new hypervisor memory component 124' has replaced old hypervisor memory component 120'.

When the new hypervisor is launched, it is passed the memory map of the system. On a cold reboot, this is usually the map that is generated by the BIOS (Basic Input Output System) and passed on to the system. This map includes memory ranges that are reserved for BIOS as well as free memory ranges. In the case of doing the soft reboot, we change the memory map to include new memory ranges that contain all the memory associated with suspended virtual machines. These ranges are marked by a separate memory type. When the new hypervisor launches, it knows that these ranges have virtual-machine data and need to be handled as such. There are two new memory types in the map: 1) a memory type for the metadata associated with the suspended virtual machines. (e.g., the number of virtual machines and their descriptions); and 2) a memory type that has the actual data/state of the respective virtual machines in different memory ranges.

Process 200 does not shut down the resident virtual machines VM1-VMN and they are not removed from memory. There is no need to launch them after the hypervisors are exchanged, and there is no need to load their in-memory components after the hypervisors are exchanged. Therefore, any interruption in the activity of the resident virtual machines is limited to the time taken to exchange the hypervisors. Also note that "hypervisor exchange" encompasses upgrades, downgrades, cross grades, updates, and reversions.

In process 200, virtual machines are suspended and resumed one by one. In some cases, it may be desirable to suspend all resident virtual machines at once and/or to resume them all at once. A synchronous suspend and resume can be achieved using a hypervisor exchange process 400, which is flow-charted in FIG. 4. At 401, resident virtual machines VM1-VMS are executed on an old hypervisor. The state is that represented in FIG. 1 for computer system 100. At 402, a host virtual machine is created with a guest hypervisor. The host virtual machine runs on the old hypervisor. At 403, the resident virtual machines are migrated from the old hypervisor to the guest hypervisor. The result of action 403 is represented in FIG. 5.

Figure 5:
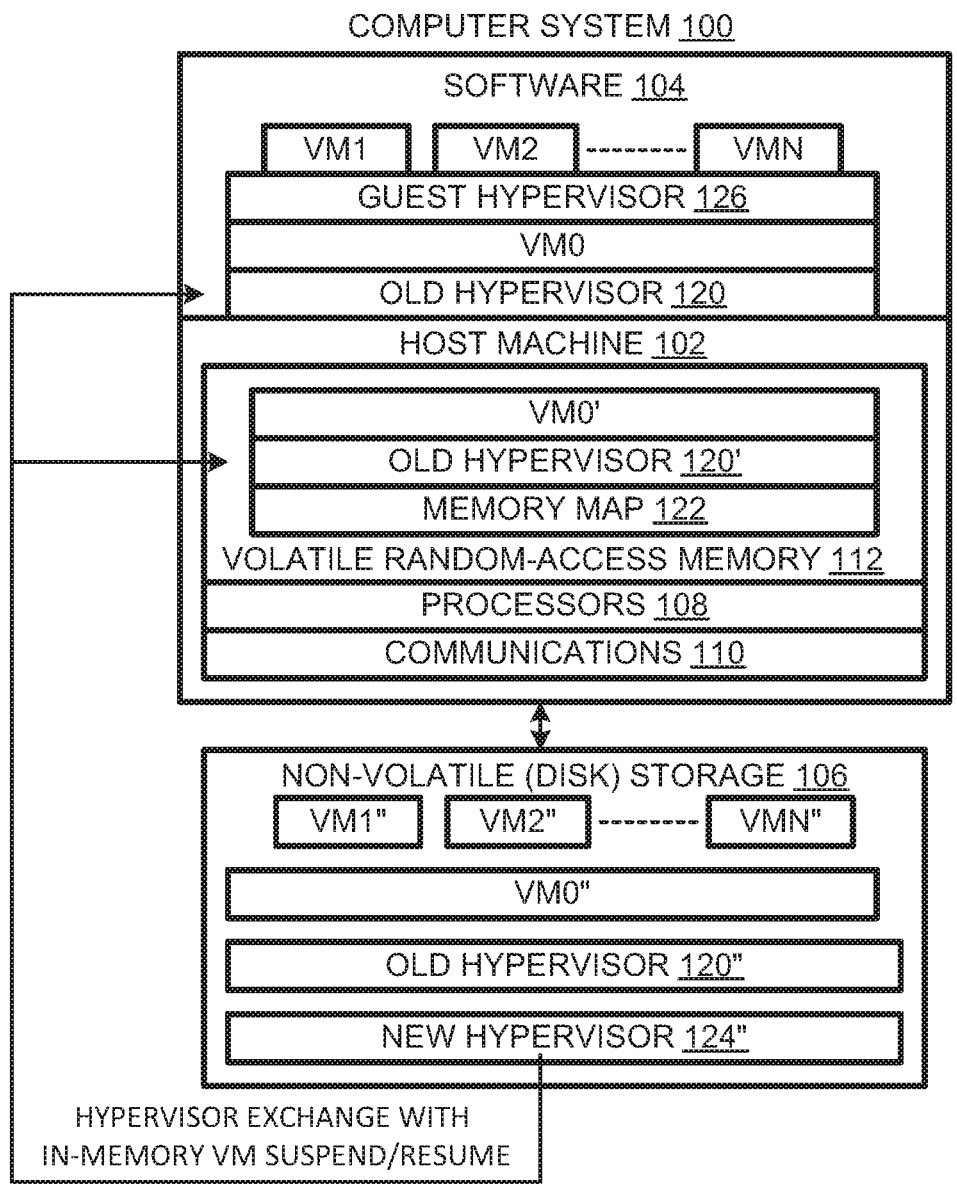
FIG. 5 is a schematic diagram of the computer system of FIG. 1 with its resident virtual machines migrated to a guest hypervisor as called for by the process of FIG. 4.

At the time represented in FIG. 5, resident virtual machines VM1-VMN have been migrated from old hypervisor 120 to guest hypervisor 126, which is running on host virtual machine VM0. Host virtual machine VM0 is running on old hypervisor 120. A host-machine component VM0' resides in memory, while a virtual-machine image VM0" is stored in storage 106.

Figure 4:
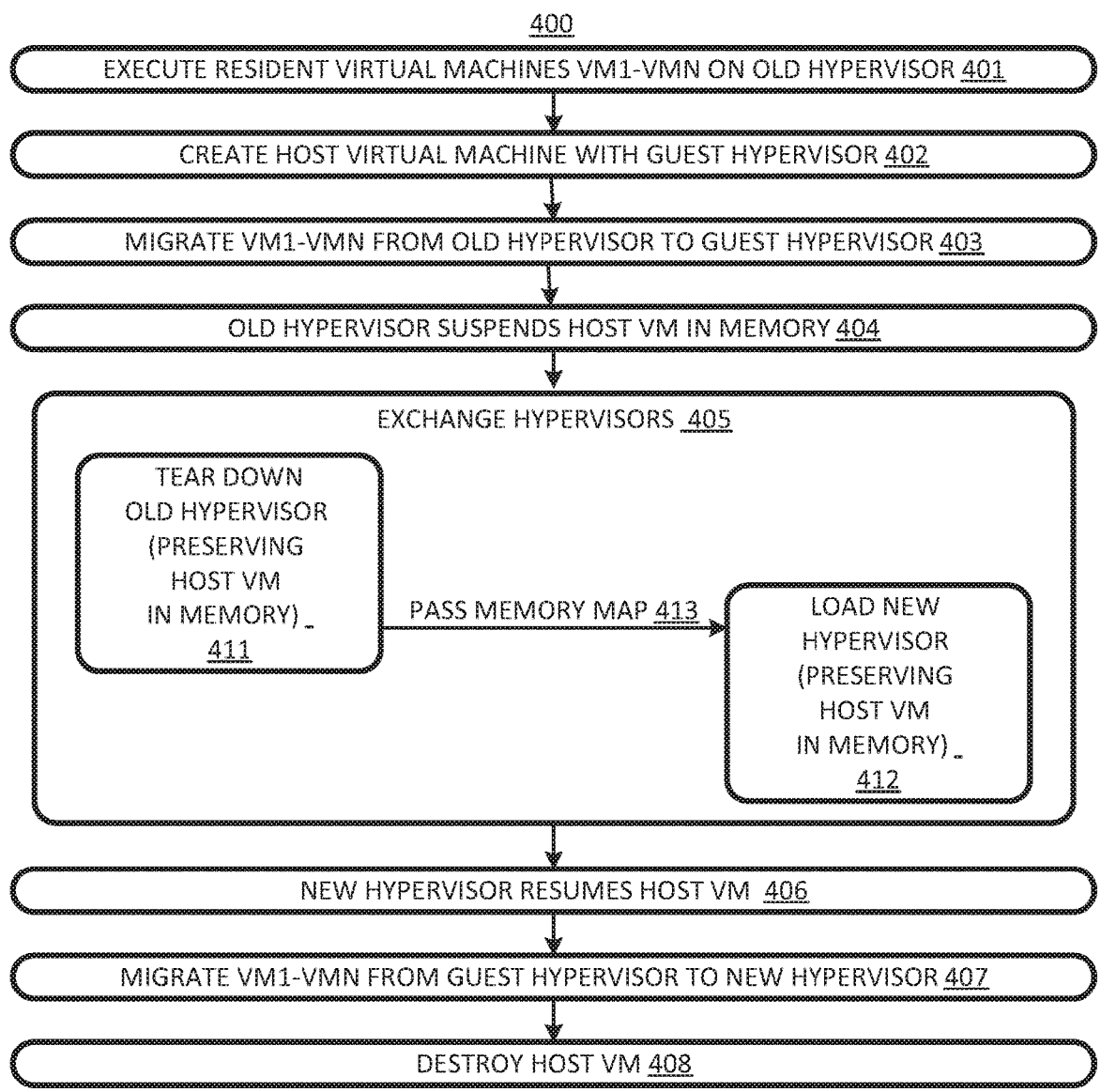
FIG. 4 is a flow-chart of a hypervisor exchange process in which virtual machines are migrated to a guest hypervisor of a host virtual machine created on an old hypervisor.

From the state represented in FIG. 5, at 404, FIG. 4, the old hypervisor suspends-in-memory host virtual machine VM0; suspending host virtual machine VM0 also suspends the guest hypervisor and the resident virtual machines. At 405, the old hypervisor is exchanged for a new hypervisor. At 406, the new hypervisor resumes the host virtual machine. Since the in-memory component of the host virtual machine has been preserved, there is no need to load such a component from storage. The latency otherwise required for transfers of an in-memory component to and from storage is avoided. At 407, the resident virtual machines are migrated from the guest hypervisor to the new hypervisor. At 408, the host virtual machine and the guest hypervisor are destroyed. The result is represented in FIG. 3.

During exchange 405, the old hypervisor is torn down, at 411. The memory map is used to preserve the in-memory component VM0' of the host virtual machine VM0. During the tear down of the old hypervisor, at 412, the new hypervisor disk image is used for launching the new hypervisor. During the overlap between tear down 411 and launch 412, the memory map and other state and configuration data is passed from the old hypervisor to the new, e.g., over memory or storage. The new hypervisor uses the memory map during launch to preserve the in-memory component of the host virtual machine.

Figure 6:
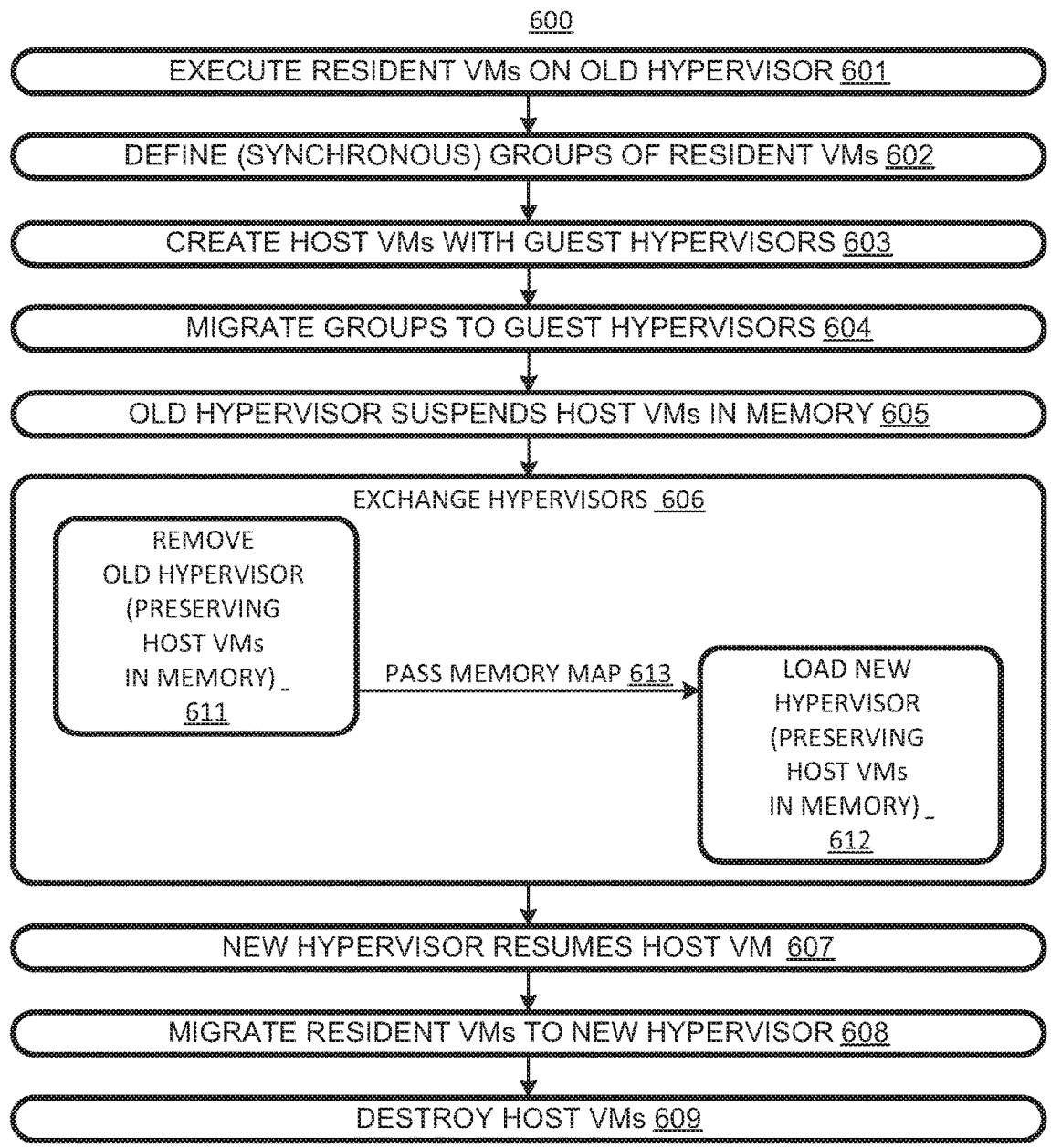
FIG. 6 is a flow-chart of a hypervisor-exchange process in which resident virtual machines are grouped and migrated to guest hypervisors running in host virtual machines running on an old hypervisor.

In some cases, if the total resource demand by the resident virtual machines is sufficiently large, consolidating them all into a single host virtual machine can cause performance problems. Accordingly, a process 600, flow-charted in FIG. 6, provides for the resident virtual machines to be distributed among plural host virtual machines (and their guest hypervisors).

At 601, resident virtual machines are executed on an old hypervisor. In some embodiments, at 602, the resident virtual machines are assigned to groups, e.g., synchronous groups for which a shared state might be important. In other embodiments, the assignment into groups is omitted. At 603, host virtual machines are created. At 604, the resident virtual machines are respectively migrated to the guest hypervisors, e.g., according to the grouping.

Figure 7:
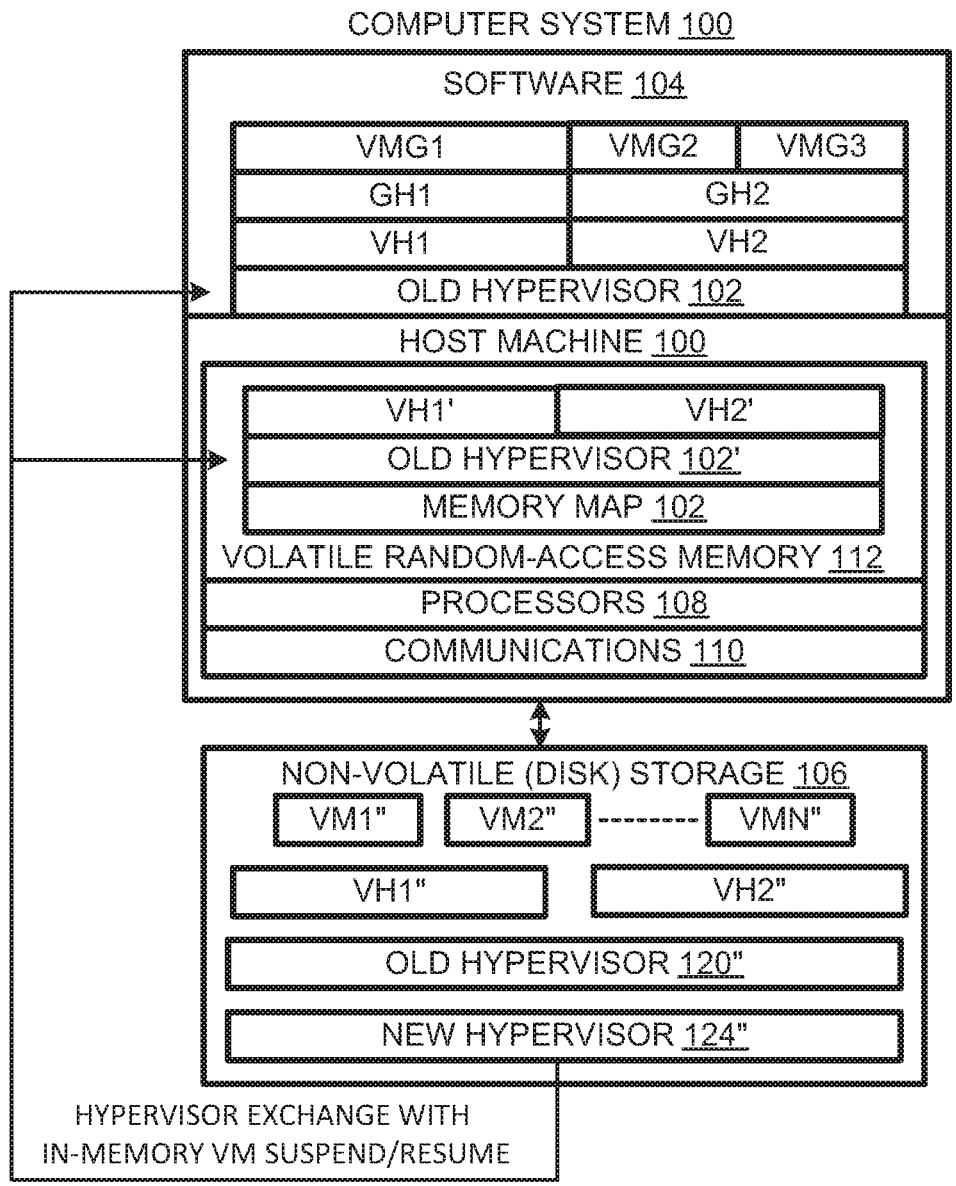
FIG. 7 is a schematic diagram of the computer system of FIG. 1 with its resident virtual machines migrated to guest hypervisors as called for by the process of FIG. 6.

Computer system 100 is shown in FIG. 7 in a state that can result from actions 601-604. Host virtual machines VH1 and VH2 are created, with guest hypervisors GH1 and GH2 respectively executing thereon. A virtual-machine group MVG1 has been migrated to guest hypervisor GH1, while virtual-machine groups VMG2 and VMG3 have been migrated to guest hypervisor GH2. Host virtual machine components VH1' and VH2' are shown in memory 112, while disk images VH1" and VH2" are stored in storage 106.

From the state represented in FIG. 7, process 600 (FIG. 6) continues at 605 with the old hypervisor suspending in memory the host virtual machines. This, of course, suspends the guest hypervisor and the resident virtual machines. At 606, there is an exchange of the old hypervisor for the new hypervisor. At 607 the new hypervisor resumes the host virtual machines. This resumes the guest hypervisors and the resident virtual machines. At 608, the resident virtual machines are migrated from the guest hypervisors to the new hypervisor. At 609, the host virtual machines are destroyed. The result corresponds to computer system 100 in the state represented in FIG. 3.

Exchange 606 includes tearing down, at 611, the old hypervisor while the host virtual machines are suspended in memory. The memory map is used to ensure that the in-memory portions of the host virtual machines are not overwritten. During the tear down, at 612, the new hypervisor is launched. At 613, the old hypervisor passes the memory map to the new hypervisor. The tear down of the old hypervisor completes. The new hypervisor uses the memory map to preserve the in-memory portions of the host virtual machines (and thus the in-memory portions of the resident virtual machines. Once the new hypervisor is fully launched, exchange 606 is complete and process 600 continues at 607, as described above.

Processes 200, 400, and 600 share a suspend-exchange-resume sequence. The suspend is a suspend-in-memory in which the in-memory portions of the virtual machines are maintained in memory during the exchange, the interruption of the virtual machines is only the time taken for the exchange itself. There is no need to store the in-memory portions of the resident virtual machines to storage prior to removing the old hypervisor and no need to load the in-memory portion of the resident virtual machines before resuming them.

Herein, art labelled "prior art", if any, is admitted prior art; art not labelled "prior art" is not admitted prior art. The illustrated embodiments along with variations thereupon and modification thereto are provided for by the present invention, the scope of which is defined by the following claims.

What is claimed is:

1. A hypervisor-exchange process comprising:
suspending, by an old hypervisor, each virtual machine instance of a virtual-machine set of at least one virtual machine executing on the old hypervisor, at least a portion of each virtual machine instance being stored in memory controlled by the old hypervisor;
in response to the suspending, creating, by the old hypervisor, a memory map, the memory map preserving a state of each virtual machine instance of the virtual machine set of the at least one virtual machine executing on the old hypervisor;
replacing the old hypervisor with a new hypervisor while each virtual machine instance of the virtual machine set is suspended, the replacing including tearing down the old hypervisor and launching the new hypervisor so that the new hypervisor assumes control of the memory originally controlled by the old hypervisor, wherein said old hypervisor suspends said each virtual machine instance of said virtual-machine set of said at least one virtual machine in memory such that said each virtual machine instance of said virtual-machine set of said at least one virtual machine can be resumed without having to be loaded first into memory, and wherein the old hypervisor passes the memory map to the new hypervisor while completing the tearing down and after the new hypervisor is launched; and
resuming, by the new hypervisor, each virtual machine instance having at least a portion stored in the memory originally controlled by the old hypervisor, said resuming performed without requiring copying of any portion of any of said each virtual machine instance.

2. The hypervisor-exchange process of claim 1 wherein the at least portions of virtual-machine instances are not copied between the suspending and the resuming.

3. The hypervisor-exchange process of claim 1 wherein the replacing includes: the old hypervisor passing a memory map of virtual machines to memory locations to the new hypervisor using the memory map to preserve in-memory portions of the virtual machines during tear down of the old hypervisor and launching of the new hypervisor.

4. The hypervisor-exchange process of claim 1 wherein the memory map describes the suspended virtual machines and their respective memory locations.

5. The hypervisor-exchange process of claim 1 wherein the passing of the memory map occurs as the old hypervisor is being torn down and as the new hypervisor is launching.

6. A hypervisor-exchange system comprising media encoded with code that, when executed by a processor, implements a process including:
suspending, by an old hypervisor, each virtual machine instance of a virtual-machine set of at least one virtual machine executing on the old hypervisor, at least a portion of each virtual machine instance being stored in memory controlled by the old hypervisor;
in response to the suspending, creating, by the old hypervisor, a memory map, the memory map preserving a state of each virtual machine instance of the virtual machine set of the at least one virtual machine executing on the old hypervisor;
replacing the old hypervisor with a new hypervisor while each virtual machine instance of the virtual machine set is suspended, the replacing including tearing down of the old hypervisor and launching the new hypervisor so that the new hypervisor assumes control of the memory originally controlled by the old hypervisor, wherein said old hypervisor suspends said each virtual machine instance of said virtual-machine set of said at least one virtual machine in memory such that said each virtual machine instance of said virtual-machine set of said at least one virtual machine can be resumed without having to be loaded first into memory, and wherein the old hypervisor passes the memory map to the new hypervisor while completing the tearing down and after the new hypervisor is launched; and
resuming, by the new hypervisor, each virtual machine instance having at least a portion stored in the memory originally controlled by the old hypervisor, said resuming performed without requiring copying of any portion of any of said each virtual machine instance.

7. The hypervisor-exchange process of claim 1 wherein the at least portions of virtual-machine instances are not copied between the suspending and the resuming.

8. The hypervisor-exchange system of claim 6 wherein the replacing includes: the old hypervisor passing a memory map of virtual machines to memory locations to the new hypervisor; and the new hypervisor using the memory map to preserve in-memory portions of the virtual machines during tear down of the old hypervisor and launching of the new hypervisor.

9. The hypervisor-exchange system of claim 6 wherein the memory map describes the suspended virtual machines and their respective memory locations.

10. The hypervisor-exchange system of claim 6 wherein the passing of the memory map occurs as the old hypervisor is being torn down and as the new hypervisor is launching.

11. The hypervisor-exchange system of claim 6 further comprising the processor.

\* \* \* \* \*